United States Patent [19]

Ohzono et al.

[11] Patent Number: 4,842,115
[45] Date of Patent: Jun. 27, 1989

[54] HYDRAULIC CLUTCH

[75] Inventors: Kouhei Ohzono; Kazuhiro Takeuchi, both of Wako; Yoshihisa Iwatsuka, Shizuoka, all of Japan

[73] Assignee: Honda Giken Kogyo Kabushiki Kaisha, Tokyo, Japan

[21] Appl. No.: 59,060

[22] Filed: Jun. 8, 1987

[30] Foreign Application Priority Data

Jun. 10, 1986 [JP] Japan .................. 61-135434

[51] Int. Cl.[4] .................. F16D 25/063; F16D 25/14; F16D 43/284
[52] U.S. Cl. .................. 192/85 F; 192/103 FA; 192/105 F
[58] Field of Search .......... 192/103 FA, 105 F, 85 F, 192/103 F; 137/58

[56] References Cited

U.S. PATENT DOCUMENTS

| | | | |
|---|---|---|---|
| 2,163,203 | 6/1939 | Kegresse | 192/103 FA X |
| 2,711,749 | 6/1955 | Hettinger | 192/103 FA X |
| 2,728,427 | 12/1955 | Lucia | 192/103 F X |
| 2,995,957 | 8/1961 | Wilson et al. | 192/103 F X |
| 3,006,213 | 10/1961 | Wilson | 192/103 F X |
| 3,171,524 | 3/1965 | Croft et al. | |
| 3,352,395 | 11/1967 | Hilpert . | |
| 3,424,029 | 1/1969 | Horsch . | |
| 3,690,429 | 9/1972 | Honda | 192/85 AA |
| 3,862,676 | 1/1975 | Schall | 192/105 F X |

FOREIGN PATENT DOCUMENTS

| | | |
|---|---|---|
| 0095258 | 4/1983 | European Pat. Off. . |
| 3305999 | 5/1984 | Fed. Rep. of Germany . |
| 938374 | 4/1948 | France . |
| 61-172309 | 8/1986 | Japan . |
| 61-278630 | 12/1986 | Japan . |
| 260791A | 5/1981 | United Kingdom . |

Primary Examiner—Rodney H. Bonck
Attorney, Agent, or Firm—Frishauf, Holtz, Goodman & Woodward

[57] ABSTRACT

A hydraulic clutch for transmitting torque from an input rotating member to an output rotating member when friction plates are brought into engagement with each other. Hydraulic fluid having pressure depending upon rotational speed of an input shaft is supplied from a hydraulic fluid source into a hydraulic pressure chamber, to cause an urging member to bring the friction plates into engagement with each other when the rotational speed of the input shaft reaches a predetermined value. A control mechanism controls opening and closing of a pressure regulating valve in response to the rotational speed of the input shaft. When the pressure regulating valve is opened, the hydraulic fluid is caused to flow from the hydraulic pressure chamber to a low pressure side, and when the pressure regulating valve is closed, the hydraulic fluid is prevented from flowing to the low pressure side. A pivot valve is operable to prevent the hydraulic fluid from flowing into the hydraulic pressure chamber when the pressure regulating valve is opened. The pilot valve regulates the hydraulic fluid to a predetermined value to permit the regulated hydraulic fluid to be supplied to the hydraulic pressure chamber when the pressure regulating valve is closed, thereby bringing the friction plates into smooth engagement with each other.

6 Claims, 6 Drawing Sheets

| FIG. 4A |
| FIG. 4B |

HYDRAULIC CLUTCH

BACKGROUND OF THE INVENTION

The present invention relates generally to hydraulic clutches and, more particularly, to a hydraulic clutch suitable for use in, for example, an automatic transmission of infinitely variable speed type for automobile vehicles.

A hydraulic clutch for use in combination with an automatic transmission of infinitely variable speed type for automotive vehicles is known, e.g. from U.S. Pat. No. 3,171,524 which employs a plurality of friction plates arranged to be urged against each other directly by a centrifugal force produced by a centrifugal governor. In the hydraulic clutch of this kind, however, the centrifugal governor has to inevitably be designed large in size, in order to obtain required transmission torque. On the other hand, another conventional hydraulic clutch, which is known, e.g. from U.S. Pat. No. 3,690,429, is constructed such that hydraulic pressure from a hydraulic fluid source is controlled to directly control the urging force applied to the friction plates. This necessitates provision of an exclusive, hydraulic pressure control mechanism outside a clutch body, making the hydraulic fluid source or pump large in size, as well as making the control system complicated in structure.

The assignee of the present application has proposed, in Japanese Provisional Patent Publication (Kokai) No. 61-278630, a hydraulic clutch which can obtain sufficient urging force applied to the friction plates, in spite of being simple in construction and compact in size. The hydraulic clutch comprises an input rotating member rotatable in unison with an output shaft of an engine, an output rotating member to which an output of the engine is transmitted through the input rotating member, a plurality of friction plates interposed between the input and output rotating members in such a manner as to be engageable with and disengageable from each other, torque being transmitted from the input rotating member to the output rotating member through the friction plates when engaged, and the torque being prevented from being transmitted from the input rotating member to the output rotating member through the friction plates when disengaged, urging means for urging the friction plates in such a direction as to enable the torque to be transmitted between the input and output rotating members, a hydraulic fluid source generating hydraulic pressure of a value depending upon rotational speed of the output shaft, a hydraulic pressure chamber defined between the urging means and the output rotating member and connectable to the hydraulic fluid source by a passageway having a restriction provided therein, pressure regulating valve means operable to cause the hydraulic fluid to leak from the hydraulic pressure chamber to a low pressure side when the rotational speed of the output shaft of the engine is below a predetermined value and operable to prevent the hydraulic fluid from leaking from the hydraulic pressure chamber to the low pressure side when the rotational speed of the output shaft of the engine is above the predetermined value, control means for controlling the pressure regulating valve means in response to the rotational speed of the output shaft of the engine, and restraining means for restraining the operation of the pressure regulating valve means due to the control of the control means, on and after a specific point during a rotational speed increasing period of the input shaft from the clutch-in rotational speed to the clutch-stall rotational speed.

Figure 1:
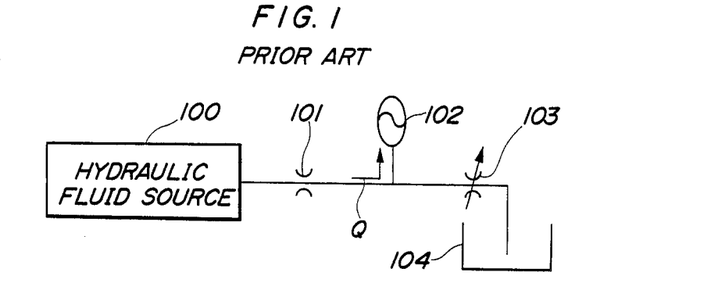
FIG. 1 is a schematic view showing a connection among a hydraulic fluid source, a pressure regulating valve, a hydraulic fluid tank and a hydraulic pressure chamber of the conventional hydraulic clutch.
Figure 2:
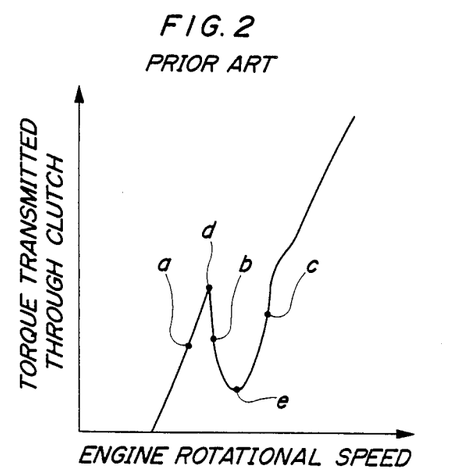
FIG. 2 is a graphical representation of a torque transmission characteristic of the conventional hydraulic clutch, with respect to rotational speed of an engine.

In the above-described clutch, as shown in FIG. 1 of the accompanying drawings, the engagement and disengagement of the clutch are controlled by the hydraulic pressure depending upon a ratio between flow rate of the hydraulic fluid flowing into the hydraulic pressure chamber 102 determined by the restriction 101 interposed between the hydraulic fluid source 100 and the hydraulic pressure chamber 102, and flow rate of the hydraulic fluid flowing into a hydraulic fluid tank 104 determined by the pressure regulating valve 103 interposed between the hydraulic pressure chamber 102 and the tank 104. FIG. 2 shows a torque transmission characteristic of the clutch equipped with such control means, i.e. a torque characteristic of a drive shaft of the automatic transmission of infinitely variable speed type. In FIG. 2, the abscissa and ordinate represent, respectively, the rotational speed of the engine, i.e. the engine output shaft and the torque transmitted through the clutch. As the engine starts and the rotational speed of the output shaft thereof reaches a predetermined value, the hydraulic pressure within the hydraulic pressure chamber 102 increases, as indicated by a segment a in FIG. 2, to bring the clutch into the engagement. In this state, the force acting upon a cam plate, not shown, by the centrifugal force produced by a control means or governor mechanism, not shown, is lower than that acting upon the cam plate by the hydraulic pressure within the hydraulic pressure chamber 102. Accordingly, the pressure regulating valve 103 is moved by the hydraulic pressure while urging the cam plate, and the pressure within the hydraulic pressure chamber 102 increases with increase in the engine rotational speed, so that the torque transmitted through the clutch increases. As the engine rotational speed further increases, the movement of the pressure regulating valve 103 permits a discharge port thereof, not shown, to be opened, at a point d in FIG. 2, to cause the hydraulic pressure to leak from the hydraulic pressure chamber 102 to the low pressure side through the discharge port. Thus, the pressure within the hydraulic pressure chamber 102 decreases, and the torque transmitted through the clutch decreases as indicated by a segment b. However, as the engine rotational speed further increases and reaches a point just before a point e in FIG. 2, the centrifugal force produced by the governor mechanism increases to overcome the force acting upon the cam plate by the hydraulic pressure. Therefore, the pressure regulating valve 103 is urged to move against the hydraulic pressure in the direction opposite to the above-mentioned direction, to close the discharge port at the point e. Closure of the pressure regulating valve 103 causes the hydraulic pressure to be supplied to the hydraulic pressure chamber 102, and the pressure within the chamber 102 rapidly increases to cause the clutch to engage.

Figure 3:
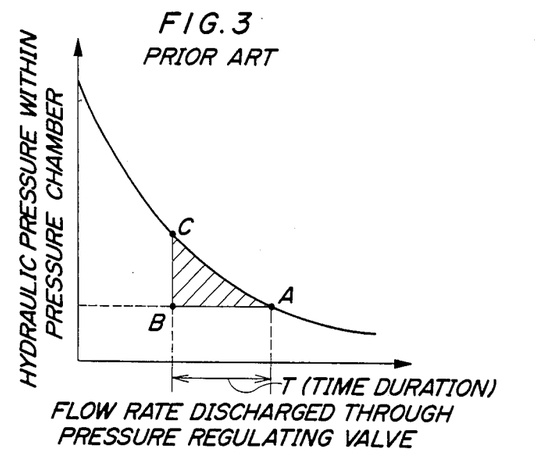
FIG. 3 is a graphical representation of a characteristic of hydraulic pressure acting upon a clutch piston with respect to flow rate discharged through the pressure regulating valve of the conventional hydraulic clutch.

Once the pressure regulating valve 103 is closed (point e in FIG. 2, point A in FIG. 3), however, the hydraulic pressure restricted by the restriction 101 is supplied to the hydraulic pressure chamber 102. Therefore, the hydraulic pressure does not immediately rise to a value required to engage the clutch, i.e. a point C in FIG. 3. so that the force acting upon the clutch piston by the hydraulic pressure is maintained balanced with the force of the spring urging the clutch piston against the hydraulic pressure, for a predetermined time duration T, and the clutch piston is kept stationary. As the hydraulic pressure reaches a point B after the lapse of the predetermined time duration T, the force urging the clutch piston against the force of the spring overcomes the force of the spring, so that the hydraulic pressure abruptly increases from the point B to the point C. This abrupt increase in the hydraulic pressure causes shocks at the engagement of the clutch.

SUMMARY OF THE INVENTION

It is an object of the invention to provide a hydraulic clutch which can obtain sufficient urging force applied to friction plates thereof, in spite of being simple in structure and compact in size and, in addition thereto, can ensure to prevent shocks at engagement of the clutch, enabling smooth engagement and disengagement of the clutch.

According to the invention, there is provided a hydraulic clutch comprising:

an input shaft;

an input rotating member rotatable in unison with the input shaft;

an output shaft;

an output rotating member rotatable in unison with the output shaft;

a plurality of friction plates interposed between the input and output rotating members in such a manner as to be engageable with an disengageable from each other to transmit torque from the input rotating member to the output rotating member when the friction plates are brought into frictional engagement with each other;

urging means interposed between the friction plates and the output rotating member for urging the friction plates in such a direction as to permit the torque to be transmitted from the input rotating member to the output rotating member;

a hydraulic pressure chamber defined between the urging means and the output rotating member and adapted to be supplied with a hydraulic fluid acting upon the urging means to cause same to urge the friction plates;

a hydraulic fluid source for supplying the hydraulic fluid;

first passage means having restriction means provided therein and communicating the hydraulic fluid source and a low pressure side with each other;

pressure regulating valve means interposed between the restriction means and the low pressure side and operable to permit the hydraulic fluid to leak from the hydraulic pressure chamber to the low pressure side when the pressure regulating valve means is opened;

control means for controlling the pressure regulating valve means in response to rotational speed of the input shaft to regulate the hydraulic pressure within the hydraulic pressure chamber;

second passage means communicating the first passage means and the hydraulic pressure chamber with each other at a location upstream of the restriction means; and pilot valve means provided in the second passage means and operable in response to closing of the pressure regulating valve means for permitting the hydraulic fluid to flow into the hydraulic pressure chamber from the first passage means through the second passage means.

Preferably, the control means is operable to open the pressure regulating valve means to permit the hydraulic fluid to flow from the hydraulic pressure chamber to the low pressure side when the rotational speed of the input shaft is below a predetermined value, and operable to close the pressure regulating valve means to prevent the hydraulic fluid from flowing from the hydraulic pressure chamber to the low pressure side when the rotational speed of the input shaft is above the predetermined value.

Still preferably, the pilot valve means is operable to cause the hydraulic fluid to be supplied to the hydraulic pressure chamber when the pressure regulating valve means is closed, and operable to prevent the hydraulic fluid from flowing into the hydraulic pressure chamber when the pressure regulating valve means is opened.

Still further preferably, the hydraulic fluid source is designed to supply the hydraulic fluid of a pressure depending upon the rotational speed of the input shaft.

Preferably, a pilot valve means regulates the hydraulic fluid from the first passage means, to a predetermined pressure and permits the hydraulic fluid of the regulated predetermined pressure to flow into the hydraulic pressure chamber.

The above and other objects, features and advantages of the invention will become more apparent from the ensuing detailed description take in conjunction with FIGS. 4 through 10 of the accompanying drawings.

BRIEF DESCRIPTION OF THE DRAWINGS

FIGS. 4A and 4B together illustrate a longitudinal cross-sectional view showing an automatic transmission of infinitely variable speed type for automotive vehicles, which is equipped with a hydraulic clutch according to an embodiment of the invention, FIG. 4 showing the orientations of FIGS. 4A and 4B.

DETAILED DESCRIPTION

The invention will now be described in detail with reference to FIGS. 4 through 10 of the accompanying drawings in which FIGS. 4A and 4B together are a longitudinal cross-sectional view showing an automatic transmission of infinitely variable speed type for automotive vehicles, which is equipped with a hydraulic clutch according to an embodiment of the invention. The hydraulic clutch, generally designated by the reference numeral 1, is mounted on a drive shaft 3 of the automatic transmission 2. The hydraulic clutch 1 comprises an input rotating member 6 rotatable in unison with an output shaft 5 of an internal combustion engine 4, and an output rotating member 7 rotatable in unison with the drive shaft 3. The output shaft 5 of the engine 4 and the drive shaft 3 of the transmission 2 serve as an input shaft and an output shaft of the clutch 1, respectively. The input rotating member 6 comprises a disc 8, a cylindrical boss 9 integrally provided on a central portion of the disc 8, and gear teeth 10 integrally formed on the outer peripheral surface of the disc 8. The cylindrical boss 9 is rotatably mounted on the drive shaft 3 through bearings 11, and the gear teeth 10 are in mesh with a gear 12 mounted on an end portion of the output shaft 5 of the engine 4 for rotation therewith.

A clutch damper 13 of a known type is attached to the disc 8 of the input rotating member 6. Control means 15 for controlling pressure regulating valves 32 subsequently to be described is mounted on an axial end face of the input rotating member 6 facing the output rotating member 7. The control means 15 is of a centrifugal governor type and comprises a governor housing 16 riveted to the disc 8 of the input rotating member 6, a cam plate 17 axially slidably received within the governor housing 16, and governor balls 18 radially movably interposed between a cam surface 17a of the cam plate 17 and a guide surface 16a of the governor housing 16. The cam plate 17 is biased toward the input rotating member 6 by a coiled spring 20 interposed between the cam plate 17 and a spring seat member 19. When the rotational speed of the output shaft 5 is lower than a predetermined value, the governor balls 18 are displaced radially inwardly so that the cam plate 17 is biased to an extreme position toward the input rotating member 6 by the biasing force of the spring 20. As the rotational speed of the output shaft 5 exceeds the predetermined value, the balls 18 are displaced radially outwardly due to their own centrifugal force to cause the cam plate 17 to be correspondingly displaced toward the output rotating member 7 against the biasing force of the spring 20.

The output rotating member 7 comprises a clutch cylinder 21 integrally formed on the output peripheral surface of the drive shaft 3 and a clutch outer member 22 fixedly secured to the clutch cylinder 21 against circumferential and axial movement relative thereto. The clutch cylinder 21 comprises an annular peripheral wall 25 projecting axially in an integral manner from an axial end face of a stationary pulley element 24 facing the cam plate 17, which stationary pulley element 24 is one of components forming a driving pulley 23 subsequently to be described. The clutch outer member 22 is fixedly secured to an axial free end of the annular peripheral wall 25 of the clutch cylinder 21. A clutch piston 26 serving as urging means is axially slidably received within the annular peripheral wall 25 and is actuated by a hydraulic fluid or pressurized oil introduced into a hydraulic pressure chamber 28 defined between the clutch piston 26 and the clutch cylinder 21, to urge a plurality of friction plates formed of clutch plates 27 and 47 subsequently to be described. The clutch piston 26 is urged by a belleville spring 29 toward the output rotating member 7, i.e. in a direction disengaging the clutch 1.

The clutch piston 26 is liquid-tightly fitted, for axial sliding, on the drive shaft 3 through an annular block member 30 which is liquid-tightly received in a central bore 26a formed in the clutch piston 26. The block member 30 is interposed between the cam plate 17 and the clutch cylinder 21 and is liquid-tightly fitted, at a central bore 30a formed in the block member 30, on the drive shaft 3 against circumferential and axial movement relative thereto.

The hydraulic pressure chamber 28 is disposed to be supplied with hydraulic fluid from a hydraulic fluid source or pump P through a pair of pilot valves 31 (only one illustrated in FIG. 4A), and the hydraulic fluid introduced into the hydraulic pressure chamber 28 can be discharged, through three pressure regulating valves 32 (only one illustrated in FIG. 4A), to a low pressure side or a hydraulic fluid tank 80.

Figure 5:
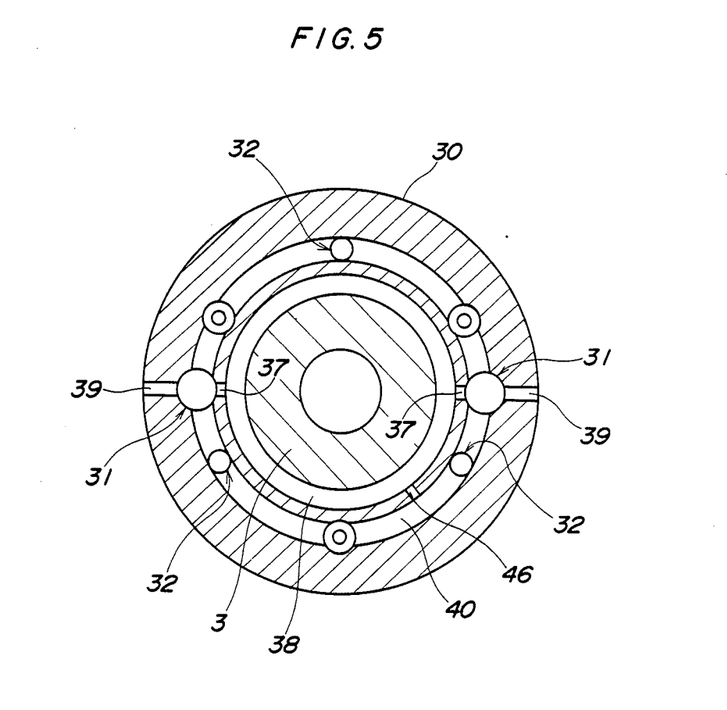
FIG. 5 is a cross-sectional view taken along line V—V of FIG. 4A.
Figure 6:
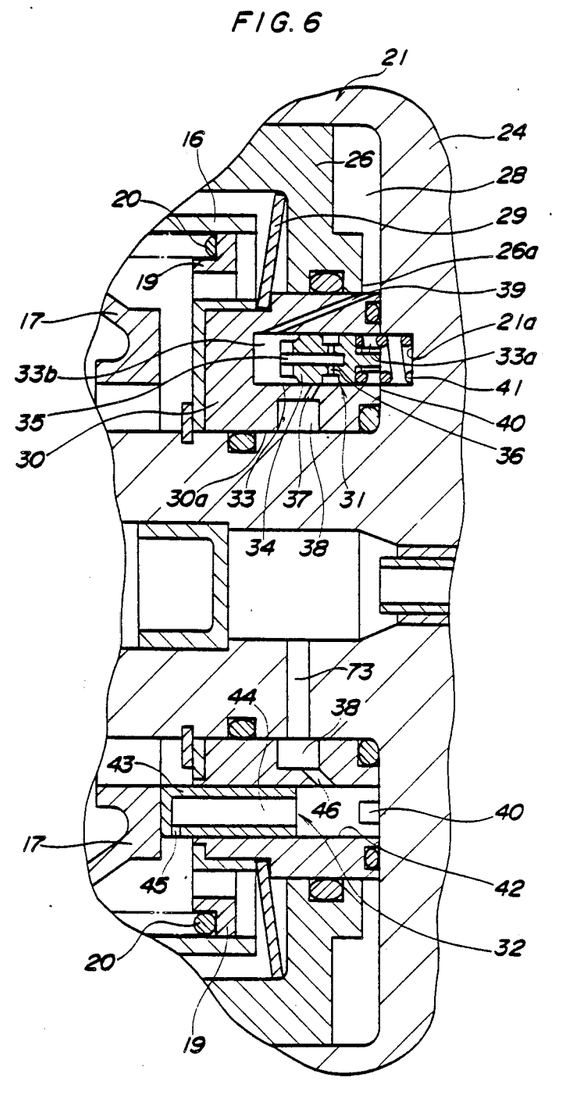
FIG. 6 is an enlarged cross-sectional view showing an essential portion of the hydraulic clutch illustrated in FIGS. 4A and 4B are.

The pair of pilot valves 31 are, as shown in FIG. 5, arranged in the block member 30 in circumferentially spaced relation through 180 degrees. These pilot valves 31 are identical in construction with each other and, as best shown in FIG. 6, each of the pilot valves 31 comprises a spool-like valve body 34 slidably received in a corresponding one of axial bores 33 formed in the block member 30. The valve body 34 is provided with a central bore 35 having one end opening in one end face of the valve body 34 adjacent the cam plate 17 and the other closed end, and a port 36 having one end communicating with the other end of the central bore 35 in perpendicular relation thereto and the other end opening in the peripheral surface of the valve body 34.

An intermediate portion of each of the axial bores 33 communicates with a first annular passage 38 provided in the peripheral wall surface of the central bore 30a in the block member 30 through a corresponding one of first communication bores 37 formed therein. One end of each of the axial bores 33 communicates with the hydraulic pressure chamber 28 through a corresponding one of second communication bores 39 formed in the block member 30. The other end of each of the axial bores 33 communicates with the pressure regulating valves 32 through a second annular passage 40 provided in the block member 30. The thus constructed pilot valve 31 starts to be moved leftward or rightward as viewed in FIG. 7 in such a manner that pressure applied to the right end face of the valve body 34 as viewed in FIG. 7 which is constantly urged rightward by the action of the spring 41 balances the total of the urging force of the spring 41 and the hydraulic pressure supplied through the pressure regulating valve 32. When the valve body 34 moves to an extreme position toward the one end of the axial bore 33 i.e. occupies a position illustrated in FIG. 8(a), the first passage 38 is brought into communication with the hydraulic pressure chamber 28 through the first communication bore 37, the port 36 and the central bore 35 both formed in the pilot valve 31, and the second communications bore 39 in the mentioned order. On the other hand, when the valve body 34 moves to an extreme position toward the other end of the axial bore 33, i.e. occupies a position illustrated in FIG. 8(b), the first communication bore 37 is closed by the peripheral surface of the valve body 34, to interrupt the communication between the first passage 38 and the hydraulic pressure chamber 28. The valve body 34 is urged toward the one end of the axial bore 33 by a spring 41 which is interposed between the other end face of the valve body 34 and a spring seat 21a formed in the inner end face of the clutch cylinder 21.

The three pressure regulating valve values 32 are, as shown in FIG. 5, arranged in the block member 30 in circumferentially spaced relation through 120 degrees. These valves 32 are identical in construction with each other and, as shown in FIG. 6, each of the valves 32 comprises a spool-like valve body 43 slidably received in a corresponding one of axial bores 42 formed through the block member 30. The valve body 34 is provided with a central bore 44 having one end opening in an axial one end face of the valve member 34 remote from the cam plate 17 and the other end closed, and a discharge port 45 having one end communicating with the other end of the central bore 44 in perpendicular relation thereto and the other end opening in the outer peripheral surface of the valve body 43. The one end of each of the axial bores 42 remote from the cam plate 17 communicates with the other ends of the respective axial bores 33 of the respective pilot valves 31 through the second annular passage 40. The other end of each of the axial bores 42 for the respective pressure regulating valves 32 communicates with the first passage 38 through a corresponding one of supply ports or orifices 46 formed in the block member 30 and serving as restriction means.

Referring again to FIGS. 4A and 4B, the clutch plates 27 to be urged by the clutch piston 26 are interposed between the input and output rotating members 6 and 7, and are mounted on the inner peripheral surface of the clutch outer member 22 against circumferential movement but for axial movement relative thereto. Each of the clutch plates 47 is interposed between a corresponding pair of adjacent clutch plates 27 and is mounted on the outer periphery of the governor housing 16 against circumferential movement but for axial movement relative thereto. When the clutch piston 26 is actuated to bring the clutch plates 27 into frictional engagement with the clutch plates 47, the friction force between the clutch plates 27 and 47 enables torque to be transmitted from the input rotating member 6 to the output rotating member 7, while when the piston 26 is returned to disengage the clutch plates 27 from the clutch plates 47, the torque transmission between the input and output rotating members 6 and 7 is interrupted.

The supply ports 46 communicate with the hydraulic fluid source or the pump P.

Figures 4, 4B:
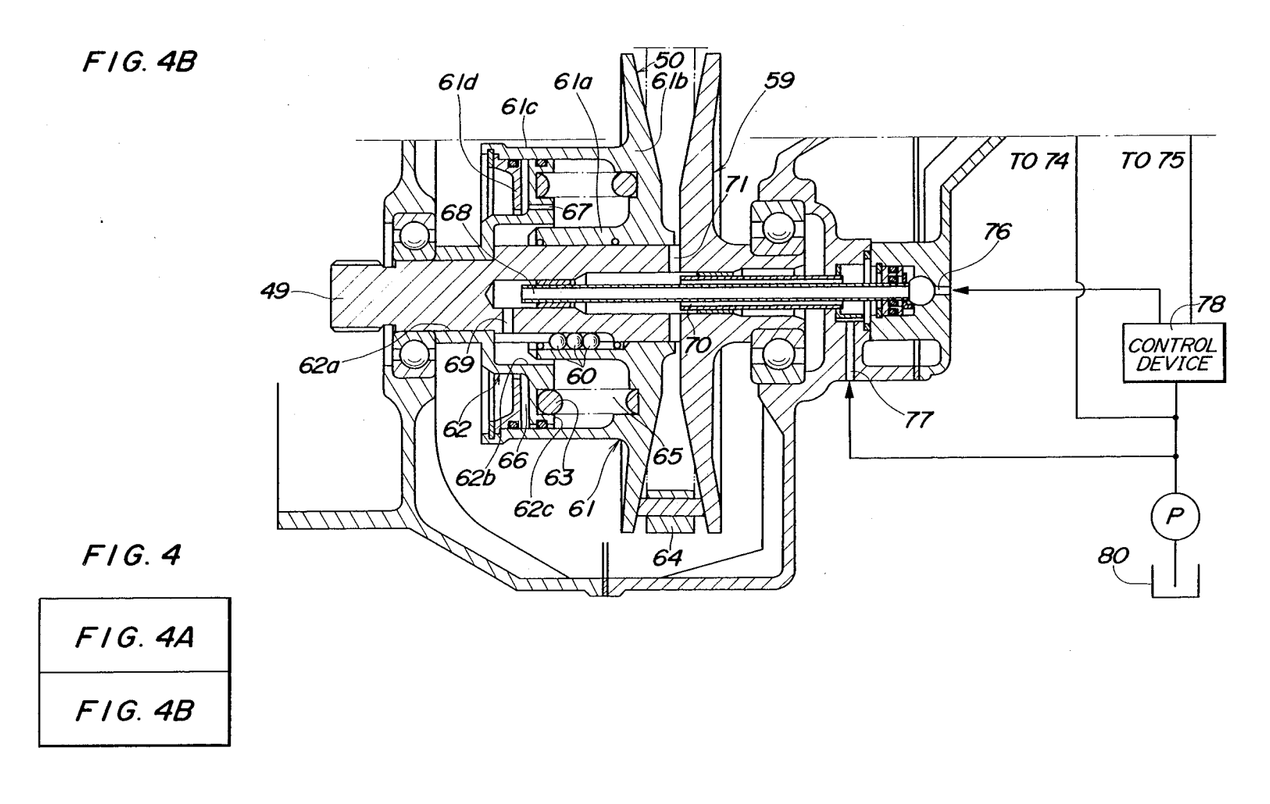
Figure 4A:
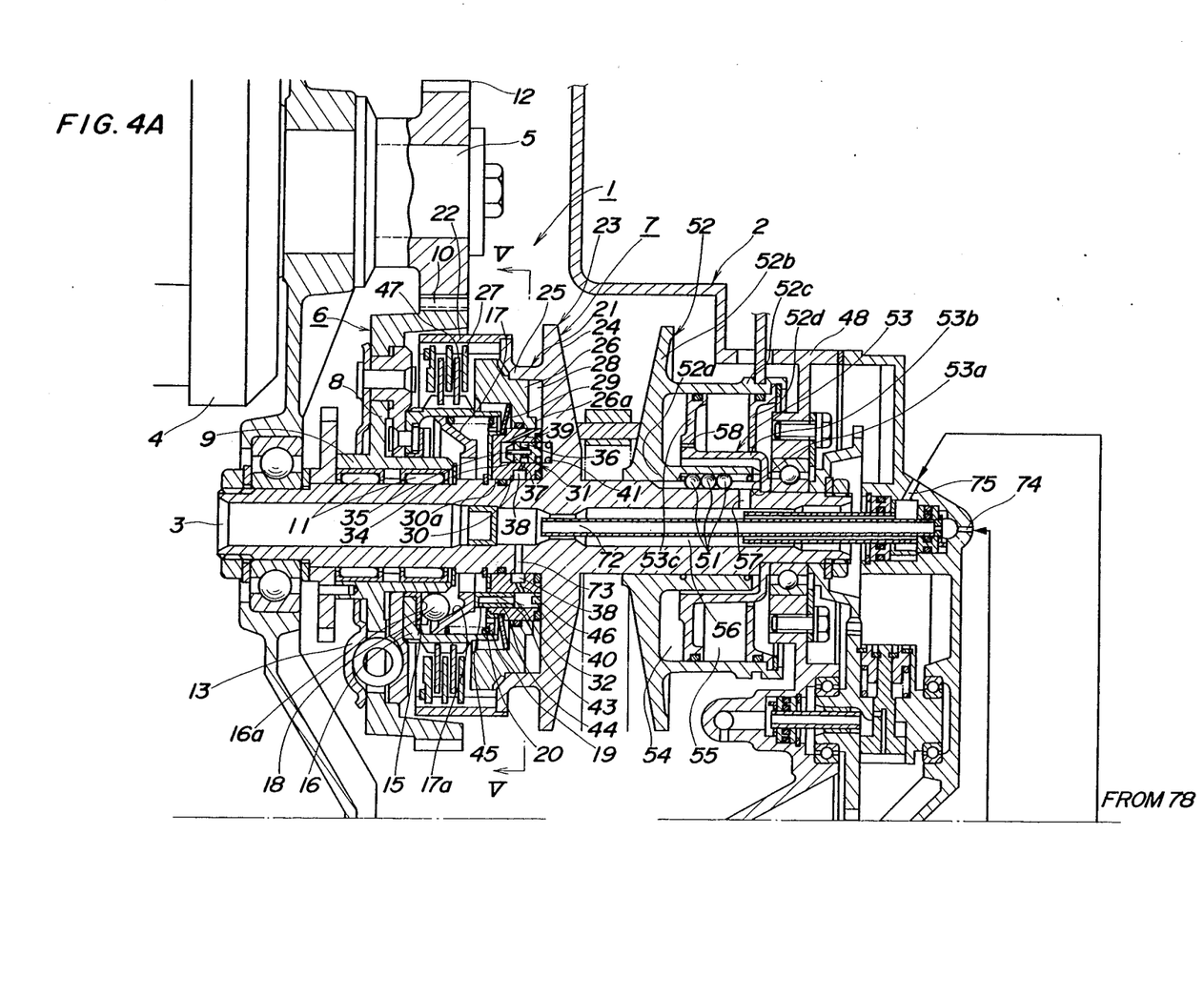
Figure 8:
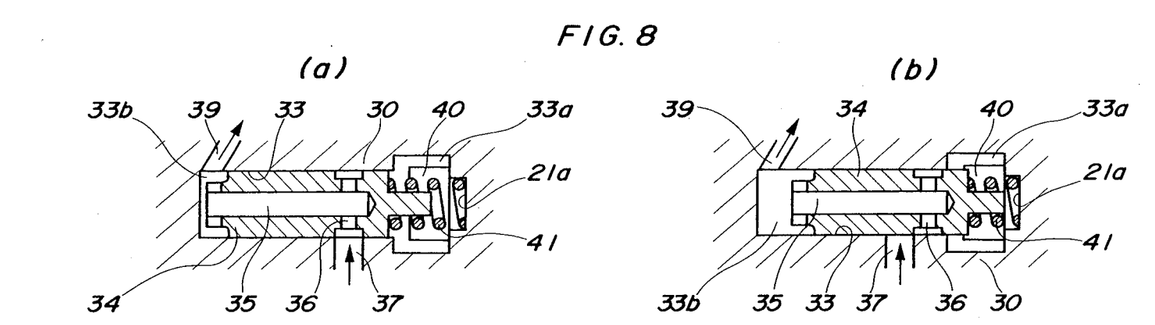
FIGS. 8(a) and 8(b) are fragmental cross-sectional views useful in explaining the operation of the pilot valves illustrated in FIGS. 4A, 4B and 6.

When the rotational speed of the engine 4 or the rotational speed of the output shaft 5 is above a predetermined value, in other words, when the throttle valve of the engine 4 is opened, the governor balls 18 move radially outwardly under the centrifugal force to urge the cam plate 17 against the biasing force of the spring 20 toward the output rotating member 7, i.e. to the right as viewed in FIGS. 4A, 4B and 6. Following the movement of the cam plate 17, the valve member 43 of each of the pressure regulating valves 32 is urged by the cam plate 17 to move in the same direction. As the discharge port 45 of each of the pressure regulating valves 32 is closed by the peripheral wall surface of the corresponding axial bore 42, the hydraulic pressure within a chamber 33a at the one end of each of the axial bores 33 for the respective pilot valve 31 adjacent the corresponding spring 41 increases. The resultant force of the hydraulic pressure and the biasing force of each of the springs 41 causes the corresponding valve body 34 to be urged to move toward a chamber 33b at the other end of the corresponding axial bore 33 remote from the spring 41, to bring the port 36 of the valve body 34 into alignment and communication with the corresponding first communication bore 37 formed in the block member 30. Thus, the hydraulic fluid is prevented from being discharged through the discharge ports 45 of the respective pressure regulating valves 32, but is introduced into the hydraulic pressure chamber 28 through the first passage 38 and the first communication bores 37 formed in the block member 30, the ports 36 and the central bores 35 both formed in the respective valve members 34 of the pilot valve 31, the chambers 33b at the respective other ends of the axial bores 33, and the second communication bores 39 formed in the block member 30, in the mentioned order. On this occasion, the hydraulic fluid is introduced into the hydraulic pressure chamber 28 in such a manner that the resultant force of the biasing force of each of the springs 41 and the hydraulic pressure within the chamber 33a at the one end of the corresponding axial bore 33 is balanced with the force due to the hydraulic pressure within the chamber 33b at the other end of the axial bore 33, as shown in FIG. 8(a). As a result, at the time the force urging the clutch piston 26 toward the input rotating member 6 by the hydraulic pressure within the hydraulic pressure chamber 28 increases to overcome the force of the spring 29, the clutch piston 26 moves toward the input rotating member 6. Following the movement of the clutch piston 26, the clutch plates 27 are urged to move in the same direction and are brought into engagement with the clutch plates 47. Thus, the clutch 1 becomes engaged to transmit the output from the engine 4 to the output rotating member 7 through the input rotating member 6. On this occasion, the hydraulic pressure regulated by the pilot valves 31 is supplied to the hydraulic pressure chamber 28 without passing through the orifices 46. This minimizes variation or fluctuation in the hydraulic pressure due to change in the amount of the hydraulic fluid within the hydraulic pressure chamber 28, thereby making the operation of the clutch piston 26 smooth.

Figure 7:
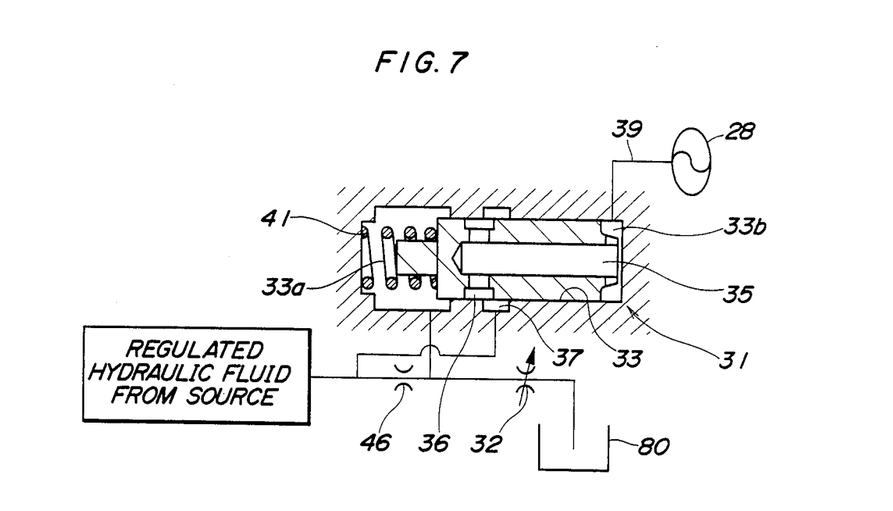
FIG. 7 is a schematic view showing a connection among a hydraulic fluid source, one of pilot valves, one of pressure regulating valves, a hydraulic fluid tank and a hydraulic pressure chamber of the hydraulic clutch illustrated in FIGS. 4A and 4B.
Figure 9:
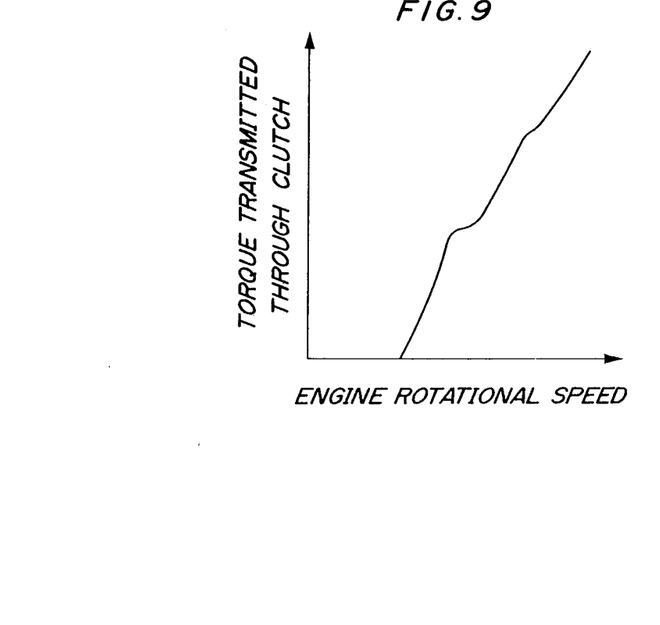
FIG. 9 is a graphical representation of a torque transmission characteristic of the hydraulic clutch according to the invention, with respect to the engine rotational speed.
Figure 10:
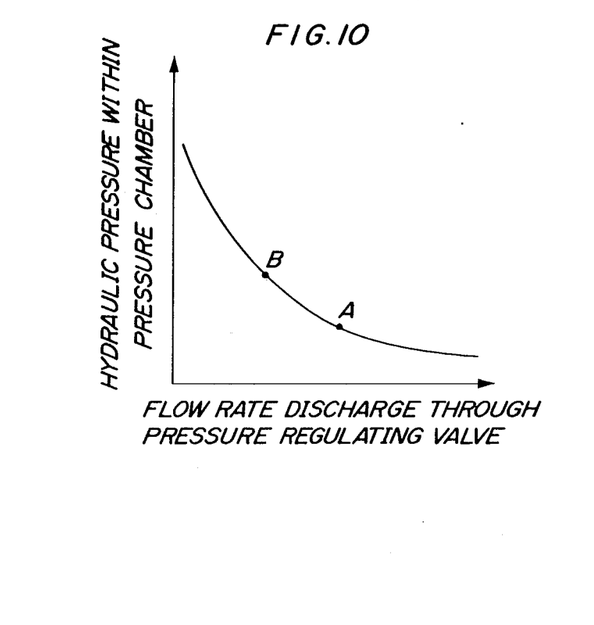
FIG. 10 is a graphical representation of a characteristic of hydraulic pressure acting upon a clutch piston with respect to flow rate discharged through the pressure regulating valve of the hydraulic clutch according to the invention.

That is, as shown in FIG. 7, when the hydraulic fluid is supplied to the hydraulic pressure chamber 28, the regulated hydraulic fluid from the hydraulic fluid source or pump P is regulated to the predetermined pressure by the pilot valve 31 and is supplied to the hydraulic pressure chamber 28 without passing through the orifice or supply port 46. Therefore, the hydraulic fluid supplied to the hydraulic chamber 28 is not subjected to fluctuation in the hydraulic pressure. Thus, as shown in FIG. 9, there is provided a torque transmission characteristic of the clutch 1, which has no reduction in the torque and, as shown in FIG. 10, it is possible to shift from the point A to the point B without reduction in the hydraulic pressure, unlike the conventional clutch. For this reason, no shocks occur at the engagement of the clutch 1.

When the rotational speed of the output shaft 5 is below a predetermined value, the valve body 43 of the pressure regulating valve 32 is displaced to the maximum in a direction toward the input rotating member 6, by the hydraulic fluid introduced through the radial port 73, to thereby open the discharge port 45.

The arrangement of the automatic transmission 2 of infinitely variable speed type equipped with the hydraulic clutch 1 according to the embodiment of the invention will now be described with reference to FIGS. 4A and 4B.

As illustrated in FIGS. 4A and 4B, the automatic transmission 2 comprises a casing 48, the aforesaid drive shaft 3, a driven shaft 49, the aforesaid driving pulley 23 mounted on the drive shaft 3, and a driven pulley 50 mounted on the driven shaft 49.

The drive pulley 23 comprises the aforesaid disc-shaped stationary pulley element 24 formed integrally on the outer peripheral surface of the drive shaft 3, and a movable pulley element 52 arranged opposite the stationary pulley element 24 and fitted via a plurality of balls 51 on the drive shaft 4 for axial sliding therealong but against circumferential movement relative thereto. The movable pulley element 52 is generally in the form of a drum and is comprised of a cylindrical boss 52a, a disc-shaped main body 52b projecting radially outwardly in an integral manner from the outer peripheral surface of one end of the boss 52a, a cylindrical peripheral wall 52c axially projecting integrally from a radially intermediate portion of the main body 52b in a direction away from the stationary pulley element 24, and an annular closure plate 52d fixedly mounted on the inner peripheral surface of a projecting end of the peripheral wall 52c.

Received within the movable pulley element 52 is a stationary piston member 53 which is comprised of a hollow cylindrical body 53b having one end wall formed with a central fitting bore 53a and the other end open, and an annular flange 53c projecting radially outwardly in an integral manner from the other open end of the cylindrical body 53b. The stationary piston member 53 is fitted, at the fitting bore 53a, on the drive shaft 3 against circumferential and axial movement relative thereto. The cylindrical body 53b is loosely fitted about the boss 52a of the movable pulley element 52, while the flange 53c has its outer peripheral surface in slidable contact with the inner peripheral surface of the cylindrical peripheral wall 52c of the movable pulley element 52 in a liquid-tight manner.

A first hydraulic pressure chamber 54 is defined between the main body 52b of the movable pulley element 52 and the flange 53c of the stationary piston member 53, while a second hydraulic pressure chamber 55 is defined between the closure plate 52d of the movable pulley element 52 and the flange 53c of the stationary piston member 53. The first hydraulic pressure chamber 54 communicates with the hydraulic fluid source or pump P through an axial communication passage 56 formed in the drive shaft 3 along its axis and a radial port 57 formed in the drive shaft 3. The flange 53c is formed therethrough with an orifice 58 through which the first and second hydraulic pressure chambers 54 and 55 communicate with each other, to permit the hydraulic fluid to flow from the first hydraulic pressure chamber 54 into the second hydraulic pressure chamber 55 through the orifice 58.

The driving pulley 23 has sits maximum pitch or pulley groove width in the illustrated state. As the hydraulic fluid is introduced into the first hydraulic pressure chamber 54 through the port 57, the movable pulley element 52 moves toward the stationary pulley element 24 to narrow the pulley groove width.

The driven pulley 50 comprises a stationary pulley element 59 formed integrally on the outer peripheral surface of the driven shaft 49, and a movable pulley element 61 fitted, through a plurality of balls 60, about the driven shaft 49 in facing relation to the stationary pulley element 59 for axial sliding along the driven shaft 49 but against circumferential movement relative thereto.

The movable pulley element 61 is generally in the form of a drum and is comprised of a cylindrical boss 61a, a disc-shaped main body 61b projecting radially outwardly in an integral manner from the outer peripheral surface of one end of the bos 61a, a cylindrical peripheral wall 61c axially projecting integrally from a radially intermediate portion of the end face of the pulley body 61b remote from the stationary pulley element 59, and an annular closure plate 61d fixedly mounted on an inner peripheral surface of the projecting end of the peripheral wall 61c. The peripheral wall 61c has an inner diameter substantially equal to that of the peripheral wall 52c on the movable pulley element 52 of the driving pulley 23.

Received within the movable pulley element 61 of the driven pulley 50 is a stationary piston member 62 which is comprised of a hollow cylindrical portion 62b having axial one end wall formed with a central fitting bore 62a and the other axial end open, and an annular fibgure 62c projecting radially outwardly in an integral manner from the other open end of the cylindrical portion 62b. The stationary piston member 62 is fitted, at its fitting bore 62a, on the driven shaft 49 against circumferential and axial movement relative thereto. The hollow cylindrical portion 62b is loosely fitted about the boss 61a of the movable pulley element 61, while the flange 62c has its outer peripheral surface in slidable contact with the inner peripheral surface of the peripheral wall 61c of the movable pulley element 61 in a liquid-tight manner.

A coiled spring 63 is interposed between an end face of the main body 61b of the movable pulley element 61 and the opposed end face of the flange 62c of the stationary piston member 62, to bias the movable pulley element 61 toward the stationary pulley element 59, i.e. in a direction narrowing the pitch or pulley groove width. The spring 63 serves to exert an appropriate tension on an endless belt 64 trained between the driving and driven pulleys 23 and 50 and to set the movable pulley element 61 to an initial, low speed position, during stoppage of the engine 4.

A first hydraulic pressure chamber 65 is defined between the main body 61b of the movable pulley element 61 and the flange 62c of the stationary piston member 62, while a second hydraulic pressure chamber 66 is defined between the closure plate 61d of the movable pulley element 61 and the flange 62c of the stationary piston member 62. These first and second hydraulic pressure chambers 65 and 66 communicate with each other through an orifice 67 axially formed through the flange 62c of the stationary piston member 62.

The first hydraulic pressure chamber 65 communicates with the hydraulic fluid source or pump P through a radial port 69 formed in the driven shaft 49, and a communication pipe 68 arranged within the driven shaft 49 along its axis.

A radial through-bore 71 is formed in the driven shaft 49 adjacent the stationary pulley element 59, to allow a communication pipe 70 arranged within the driven shaft 49 along its axis to communicate with the outer peripheral surface of the driven shaft 49. The through-bore 71 is disposed to be opened and closed by the boss 61a of the movable pulley element 61 as the element 61 slides along the driven shaft 49. When the through-bore 71 is opened, the hydraulic fluid flowing through the communication pipe 70 is discharged to the exterior of the driven shaft 49 through the through-bore 71 to lubricate the endless belt 64.

The driven pulley 50 has its minimum pitch or pulley groove width in the illustrated state, and the maximum amount of hydraulic fluid is introduced into the first hydraulic pressure chamber 65. As the hydraulic fluid is discharged from the first hydraulic pressure chamber 65 through the port 69, the movable pulley elemtn 61 is allowed to move, against the force of the spring 63, away from the stationary pulley element 59 or in a direction increasing the pulley groove width.

The supply ports 46 of the clutch 1 are connected to a communication pipe 72 arranged within the drive shaft 3 along its axis, through the first passage 38 formed in the block member 30 and a radial port 73 formed in the drive shaft 3. The hydraulic fluid is delivered from the pump P into the communication pipe 72 through a port 74 formed in the casing 48. A port 75 is formed in the casing 48, and the hydraulic fluid from the pump P is delivered, through the port 75, into the communication passage 56 leading to the hydraulic pressure chamber 54 associated with the driving pulley 23. A port 76 is formed in the casing 48, and the hydraulic fluid is delivered, through the port 76, into the communication pipe 68 leading to the hydraulic pressure chamber 65 associated with the driven pulley 50. Further, a port 77 is formed in the casing 48, and the hydraulic fluid is delivered, through the port 77, into the communication pipe 70 leading to the through-bore 71 for lubricating the endless belt 64.

The hydraulic fluid to be supplied from the pump P to the driving pulley 23 and the driven pulley 50 is regulated to a predetermined pressure by a control device 78.

The automatic transmission 2 constructed as described above operates as follows. As the engine 4 is run and the torque of the engine output shaft 5 is transmitted to the drive shaft 3 through the hydraulic clutch 1, the torque of the drive shaft 3 is transmitted to the driven shaft 49 through the endless belt 64 and the driven pulley 50. The movable pulley elements 52 and 61 are moved by the respective hydraulic pressures acting thereupon to vary the pulley groove widths of the respective driving and driven pulleys 23 and 50, to thereby infinitely vary the rotational speed ratio between the drive and driven shafts 3 and 49. As the hydraulic clutch 1 is disengaged during the running of the engine 4, the transmission of the torque from the engine output shaft 5 to the drive shaft 3 is interrupted.

The pump P is so usually arranged as to be driven by the output shaft 5 of the engine 4 to generate the hydraulic pressure of a value depending upon or usually proportionate to the rotational speed of the output shaft 5. However, the pump P may be driven by a drive source separate from the output shaft 5 of the engine 4.

The hydraulic clutch 1 according to the embodiment of the invention has been described as being incorporated into the automatic transmission 2 of infinitely variable speed type for automotive vehicles. However, the present invention should not be limited to this specific form. The hydraulic clutch may be incorporated into any other various apparatuses.

What is claimed is:

1. A hydraulic clutch comprising:
   an input shaft;
   an input rotating member rotating in unison with said input shaft;
   an output shaft;
   an output rotating member rotatable in unison with said output shaft;
   a plurality of friction plates interposed between said input and output rotating members in such a manner as to be engageable with an disengageable from each other to transmit torque from said input rotating member to said output rotating member when said friction plates are brought into frictional engagement with each other;
   urging means interposed between said friction plates and said output rotating member for urging said friction plates in such a direction as to permit torque to be transmitted from said input rotating member to said output rotating member;
   a hydraulic pressure chamber defined between said urging means and said output rotating member and adapted to be supplied with a hydraulic fluid acting upon said urging means to cause said urging means to urge said friction plates;
   a hydraulic fluid source of supplying the hydraulic fluid;
   first passage means having restriction means provided therein and communicating said hydraulic fluid source and a low pressure side with each other;
   second passage means branching off from said first passage means at a location upstream of said restriction means and communicating said hydraulic fluid source with said hydraulic pressure chamber;
   pressure regulating valve means interposed between said restriction means and said low pressure side and being operable to permit the hydraulic fluid to leak from said hydraulic pressure chamber to said low pressure side when said pressure regulating valve means is opened;
   control means for controlling said pressure regulating valve means in response to rotational speed of said input shaft, said control means including means for causing said pressure regulating valve means to be opened when said input shaft is not rotating, to be open until the rotational speed of said input shaft reaches a predetermined value, and to be closed after the rotational speed of said input shaft has reached said predetermined value to thereby regulate the hydraulic pressure within said hydraulic pressure chamber; and
   pilot valve means provided in said second passage means for permitting the hydraulic fluid to flow into said hydraulic pressure chamber from said first passage means through said second passage means when said pressure regulating valve means is closed;
   said pilot valve means being responsive only to hydraulic pressure regulated by said pressure regulating valve means for regulating the hydraulic fluid flowing into said hydraulic pressure chamber from said first passage means.

2. A hydraulic clutch as defined in claim 1, wherein said control means is operable to open said pressure regulating valve means to cause the hydraulic fluid to flow from said hydraulic pressure chamber to said low pressure side when the rotational speed of said input shaft is below said predetermined value, and is operable to close said pressure regulating valve means to prevent the hydraulic fluid from flowing from said hydraulic pressure chamber to said low pressure side when the rotational speed of said input shaft is above said predetermined value.

3. A hydraulic clutch as defined in claim 1, wherein said pilot valve means includes:

means for supplying the hydraulic fluid to said hydraulic pressure chamber when said pressure regulating valve means is closed; and means for preventing the hydraulic fluid from flowing into said hydraulic pressure chamber when said pressure regulating valve means is opened.

4. A hydraulic clutch as defined in claim 1, wherein said hydraulic fluid source includes means for supplying the hydraulic fluid of a pressure depending upon the rotational speed of said input shaft.

5. A hydraulic clutch as defined in claim 1, wherein said pilot valve means includes means for regulating the hydraulic fluid flowing from said first passage means into said hydraulic pressure chamber, to a predetermined pressure.

6. A hydraulic clutch as defined in claim 1, wherein said pilot valve means comprises;

a valve body arranged to open and close said second passage means, said valve body having one end face receiving the hydraulic fluid in said first passage means on a downstream side of said restriction means and another end face receiving the hydraulic fluid in said second passage means on an upstream side of said restriction means; and spring means urging said one end face of said valve body.

* * * * *

UNITED STATES PATENT AND TRADEMARK OFFICE
CERTIFICATE OF CORRECTION

PATENT NO.   : 4,842,115
DATED        : June 27, 1989
INVENTOR(S)  : OHZONO et al It is certified that error appears in the above-identified patent and that said Letters Patent is hereby corrected as shown below:

On the title page, item [57]:

In the Abstract, line 19, "pivot" should read --pilot--.

Column 12, line 24, "of" should read --for--.

Signed and Sealed this

Fifteenth Day of January, 1991

Attest:

HARRY F. MANBECK, JR.

*Attesting Officer*     *Commissioner of Patents and Trademarks*